United States Patent
Cudak et al.

(10) Patent No.: US 9,128,613 B2
(45) Date of Patent: Sep. 8, 2015

(54) POSITIONING CLICKABLE HOTSPOTS ON A TOUCHSCREEN DISPLAY

(75) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 13/608,737

(22) Filed: Sep. 10, 2012

(65) Prior Publication Data

US 2014/0071058 A1    Mar. 13, 2014

(51) Int. Cl.
G06F 3/045   (2006.01)
G06F 3/0488  (2013.01)
G06F 3/0482  (2013.01)

(52) U.S. Cl.
CPC .......... *G06F 3/04886* (2013.01); *G06F 3/0482* (2013.01)

(58) Field of Classification Search
CPC . G06F 3/04817; G06F 3/0482; G06F 3/0486; G06F 3/0488; H04M 2250/22
USPC .................. 345/173–179; 178/18.01–18.07, 178/19.01–19.07, 20.01–20.04
See application file for complete search history.

(56) References Cited

U.S. PATENT DOCUMENTS

| | | | |
|---|---|---|---|
| 6,515,685 B1 | 2/2003 | Halverson | |
| 6,772,394 B1 | 8/2004 | Kamada | |
| 7,103,852 B2 * | 9/2006 | Kairis, Jr. ..................... | 715/800 |
| 7,861,180 B2 | 12/2010 | Liu et al. | |
| 7,949,943 B2 | 5/2011 | Michaud et al. | |
| 8,456,445 B2 * | 6/2013 | De Mers et al. .............. | 345/174 |
| 2002/0059217 A1 | 5/2002 | Oya et al. | |
| 2002/0122029 A1 | 9/2002 | Murphy | |
| 2005/0021851 A1 | 1/2005 | Hamynen | |

(Continued)

OTHER PUBLICATIONS

University of Manitoba, "What is the 'fat' finger problem, Solutions, Design Exercise", Human-Computer Interaction II Course Notes (COMP 4020), www.cs.umanitoba.ca (online), Feb. 5, 2012, [accessed online Jun. 11, 2012], 49 pp., URL: www.cs.umanitoba.ca/~comp4020/01_Introduction.pdf.

(Continued)

*Primary Examiner* — Kent Chang
*Assistant Examiner* — Nelson Rosario
(74) *Attorney, Agent, or Firm* — Edward J. Lenart; Kennedy Lenart Spraggins LLP

(57) ABSTRACT

Positioning clickable hotspots on a touchscreen display, including: identifying, by a hotspot generation module, a clickable object displayed on the touchscreen display, wherein the clickable object has an associated original clickable zone for invoking the clickable object; generating, by the hotspot generation module, a clickable hotspot associated with the clickable object, wherein the clickable hotspot has an associated updated clickable zone for invoking the clickable object; determining, by the hotspot generation module, a position on the touchscreen display for placing the clickable hotspot; and placing, by the hotspot generation module, the clickable hotspot at the position on the touchscreen display, wherein the original clickable zone and the updated clickable zone cover different areas of the touchscreen display.

18 Claims, 7 Drawing Sheets

(56) References Cited

U.S. PATENT DOCUMENTS

2009/0006958 A1    1/2009    Pohjola et al.
2009/0122018 A1*   5/2009    Vymenets et al. ............ 345/173
2010/0090964 A1    4/2010    Soo et al.

OTHER PUBLICATIONS

Dawson, "Mobile Web Design: Best Practices", www.sixrevisions. com (online), Aug. 18, 2010, [accessed Jun. 11, 2012], 27 pp., URL: http://sixrevisions.com/web-development/mobile-web-design-best-practices/.

Nielsen, "Kindle Fire Usability Findings", www.useit.com (online), Dec. 5, 2011, [accessed Jun. 11, 2012], 6 pp., URL: www.useit.com/alertbox/kindle-fire-usability.html.

University of Manitoba, "Comp 4020—Human-Computer Interaction II Course Introduction" (COMP 4020), www.cs.umanitoba.ca (online), Jan. 4, 2012, [accessed online Jun. 11, 2012], 25 pp., URL: www.cs.umanitoba.ca/~comp4020/01_Introduction.pdf.

IBM Corporation, "IBM 465X-011,-12 Point of Sale (POS) Reference Diskette", User's Guide for IBM Systems Application Architecture Customer Quality Alliance, www.faqs.org (online), Mar. 30, 1992, [accessed online Jun. 11, 2012], 17 pp., URL: http://www.faqs.org/copyright/users-guide-for-ibm-systems-application-architecture/.

* cited by examiner

POSITIONING CLICKABLE HOTSPOTS ON A TOUCHSCREEN DISPLAY

BACKGROUND OF THE INVENTION

1. Field of the Invention

The field of the invention is data processing, or, more specifically, methods, apparatus, and products for positioning clickable hotspots on a touchscreen display.

2. Description of Related Art

Modern computing devices can include touchscreen displays to render content such as a web page that includes a plurality of hyperlinks. The size of such a touchscreen display, in combination with the number of hyperlinks on the page, can make it difficult for a user to select a hyperlink. This may be referred to as a 'fat finger' problem, where the size of a user's finger can actually span the space on a touchscreen display where multiple hyperlinks are rendered. A user's experience with such a touchscreen display may therefore be less enjoyable as the user finds it more difficult to accurately select desired hyperlinks, images, and other content rendered on the touchscreen display.

SUMMARY OF THE INVENTION

Methods, apparatus, and products for positioning clickable hotspots on a touchscreen display, including: identifying, by a hotspot generation module, a clickable object displayed on the touchscreen display, wherein the clickable object has an associated original clickable zone for invoking the clickable object; generating, by the hotspot generation module, a clickable hotspot associated with the clickable object, wherein the clickable hotspot has an associated updated clickable zone for invoking the clickable object; determining, by the hotspot generation module, a position on the touchscreen display for placing the clickable hotspot; and placing, by the hotspot generation module, the clickable hotspot at the position on the touchscreen display, wherein the original clickable zone and the updated clickable zone cover different areas of the touchscreen display.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
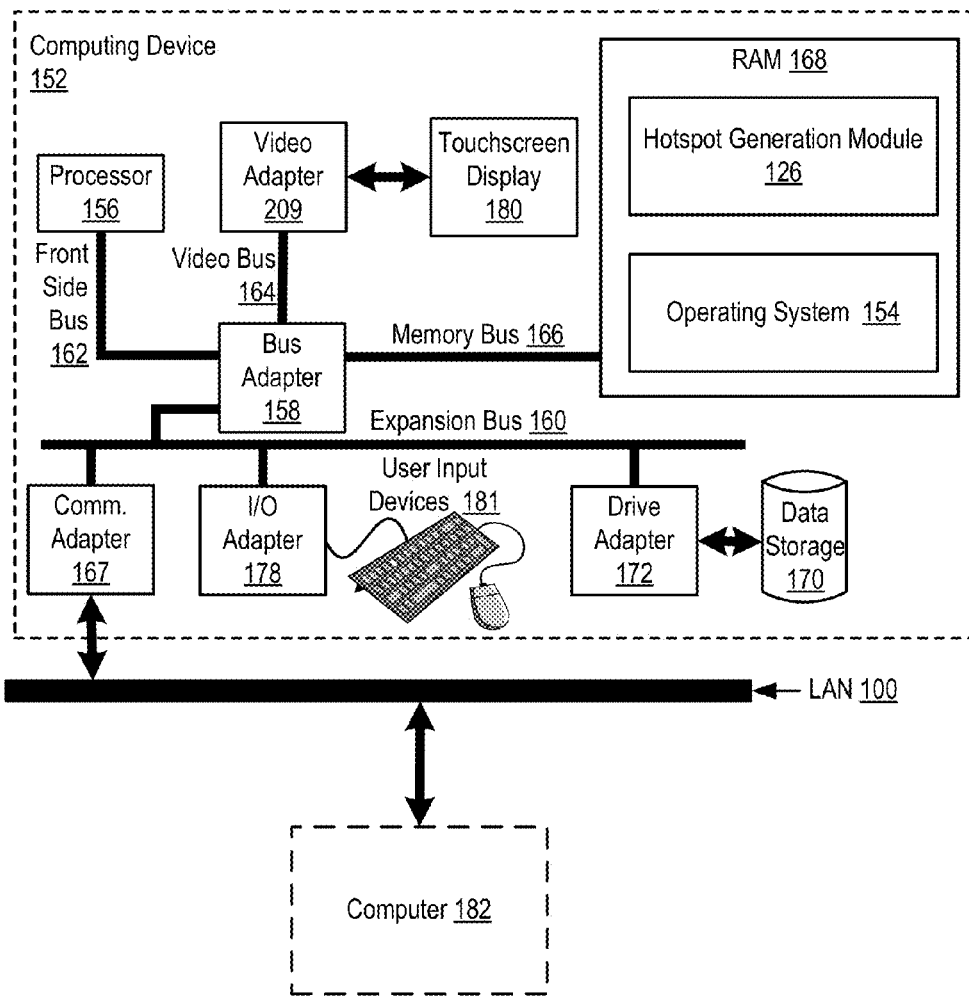
FIG. 1 sets forth a block diagram of automated computing machinery comprising an example computing device useful in positioning clickable hotspots on a touchscreen display according to embodiments of the present invention.

Example methods, apparatus, and products for [preamble] in accordance with the present invention are described with reference to the accompanying drawings, beginning with FIG. 1. FIG. 1 sets forth a block diagram of automated computing machinery comprising an example computing device (152) useful in positioning clickable hotspots on a touchscreen display (180) according to embodiments of the present invention. The computing device (152) of FIG. 1 includes at least one computer processor (156) or 'CPU' as well as random access memory (168) ('RAM') which is connected through a high speed memory bus (166) and bus adapter (158) to processor (156) and to other components of the computing device (152).

Stored in RAM (168) is a hotspot generation module (126), a module of computer program instructions for positioning clickable hotspots on a touchscreen display (180) according to embodiments of the present invention. The touchscreen display (180) is an electronic visual display configured to detect the presence and location of a touch within the display area of the touchscreen display (180). The touchscreen display (180) is part of a computing device (152) such as a mobile communications device, a tablet computer, and so on. Although the touchscreen display (180) is depicted as being part of the computing device (152), readers will appreciate that the touchscreen display (180) may also be embodied as a standalone computing device that is operatively coupled to a computing device (152) such as a personal computer, laptop computer, and the like.

The hotspot generation module (126) carries out positioning clickable hotspots on a touchscreen display (180) by identifying a clickable object displayed on the touchscreen display (180). The clickable object represents an object displayed on the touchscreen display (180) that, when touched by a user, causes some action to take place. The clickable object may be embodied, for example, as a hyperlink or icon that points to particular website, document, or other networked resource. Alternatively, the clickable object may be a component within a webform such as a text box, checkbox, radio button. The clickable object has an associated original clickable zone for invoking the clickable object. The original clickable zone for invoking the clickable object represents an area of the touchscreen display (180) that, when touched by a user, causes the clickable object to be invoked. Consider an example in which the clickable object is a hyperlink. In such an example, the original clickable zone for invoking the clickable object is the area of the touchscreen display (180) that, when touched by a user, causes the hyperlink to be invoked.

The hotspot generation module (126) further carries out positioning clickable hotspots on a touchscreen display (180) by generating a clickable hotspot associated with the clickable object. The clickable hotspot has an associated updated clickable zone for invoking the clickable object. The updated clickable zone for invoking the clickable object is an area of the touchscreen display (180) that, when touched by a user, invokes the clickable object. Consider an example in which the clickable object is a hyperlink. In such an example, the updated clickable zone for invoking the clickable object represents the area of the touchscreen display (180) that, when touched by a user, causes the hyperlink to be invoked.

The hotspot generation module (126) further carries out positioning clickable hotspots on a touchscreen display (180) by determining a position on the touchscreen display (180) for placing the clickable hotspot. The position on the touchscreen display (180) for placing the clickable hotspot may be determined, for example, such that the average distance between each clickable hotspot may be maximized, such that the distance between each clickable hotspot may be above a predetermined threshold, and so on. The position on the touchscreen display (180) for placing the clickable hotspot may be specified, for example, using pixel coordinates that specify a location on the touchscreen display (180).

The hotspot generation module (126) further carries out positioning clickable hotspots on a touchscreen display (180) by placing the clickable hotspot at the position on the touchscreen display (180) that was determined above. In the example of FIG. 1, the original clickable zone and the updated clickable zone cover different areas of the touchscreen display (180).

Also stored in RAM (168) is an operating system (154). Operating systems useful positioning clickable hotspots on a touchscreen display (180) according to embodiments of the present invention include UNIX™, Linux™, Microsoft XP™, AIX™, IBM's i5/OS™, and others as will occur to those of skill in the art. The operating system (154) and the hotspot generation module (126) in the example of FIG. 1 are shown in RAM (168), but many components of such software typically are stored in non-volatile memory also, such as, for example, on a disk drive (170).

The computing device (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of disk drive (170). Disk drive adapters useful in computers for positioning clickable hotspots on a touchscreen display (180) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing device (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing device (152) of FIG. 1 includes a video adapter (209), which is an example of an I/O adapter specially designed for graphic output to a touchscreen display device (180). Video adapter (209) is connected to processor (156) through a high speed video bus (164), bus adapter (158), and the front side bus (162), which is also a high speed bus.

The example computing device (152) of FIG. 1 includes a communications adapter (167) for data communications with other computers (182) and for data communications with a data communications network (100), telephony networks, and the like. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for positioning clickable hotspots on a touchscreen display (180) according to embodiments of the present invention include modems for wired dial-up communications, Ethernet (IEEE 802.3) adapters for wired data communications network communications, and 802.11 adapters for wireless data communications network communications, as well as adapters configured for wireless data communications with telephony networks or mobile communications networks.

Figure 2:
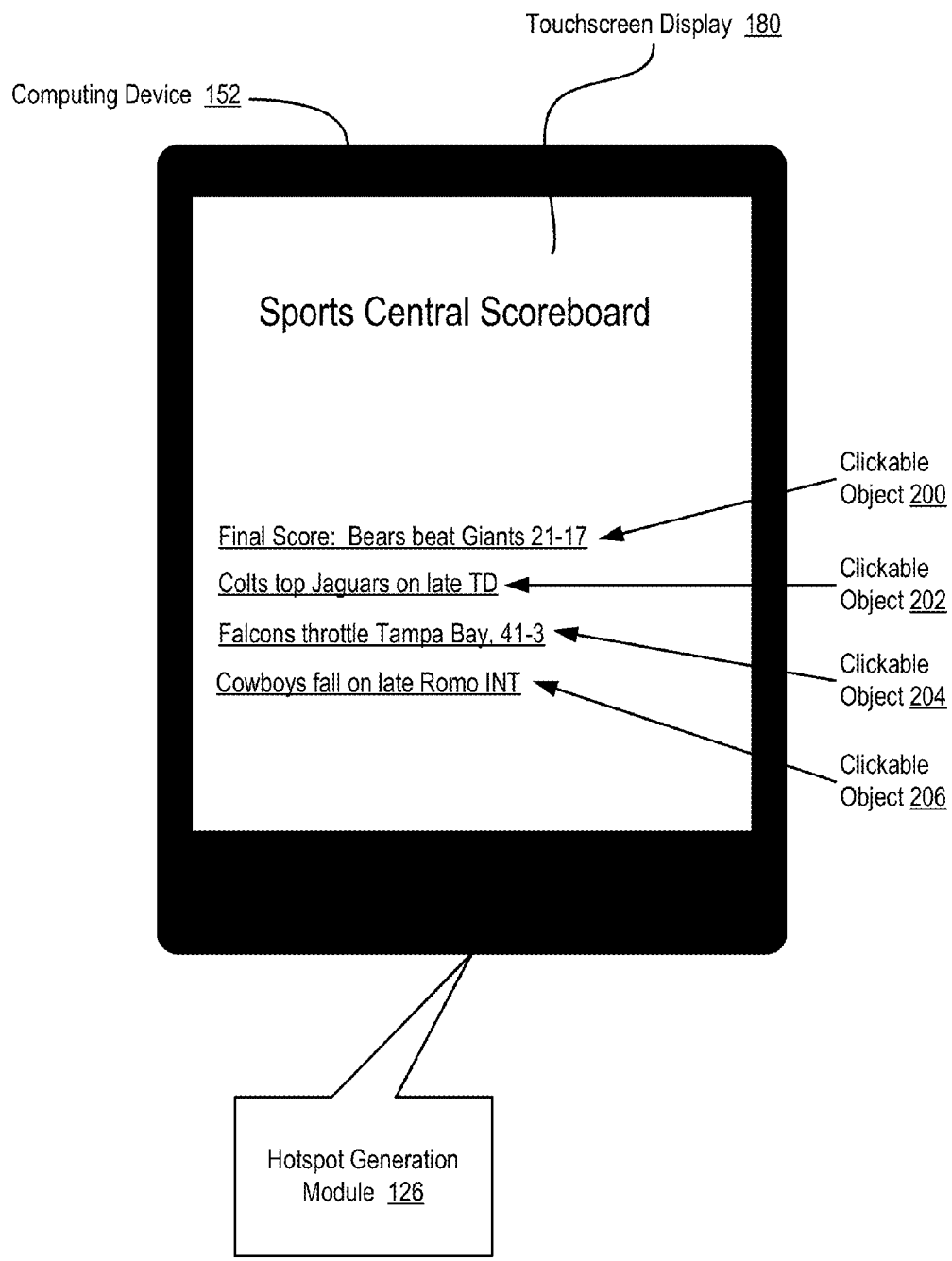
FIG. 2 sets forth a diagram of a computing device that includes a touchscreen display according to embodiments of the present invention.

For further explanation, FIG. 2 sets forth a diagram of a computing device (152) that includes a touchscreen display (180) according to embodiments of the present invention. In the example of FIG. 2, the computing device (152) includes a hotspot generation module (126) as described above with reference to FIG. 1. In the example of FIG. 2, the touchscreen display (180) is display four clickable objects (200, 202, 204, 206). The four clickable objects (200, 202, 204, 206) in the example of FIG. 2 are embodied as hyperlinks that point to articles regarding football games that were played. A user of the computing device (152) may invoke the clickable objects (200, 202, 204, 206) by touching the touchscreen display (180) at a location that includes the text identifying the hyperlink. For example, if a user desired to invoke clickable object (202), the user would need to touch the area on the touchscreen display (180) at which the text "Colts top Jaguars on late TD" is displayed. In the example of FIG. 2, the original clickable zone for each clickable object (200, 202, 204, 206) is defined as the area on the touchscreen display that includes the text identifying the hyperlink that is associated with each clickable object (200, 202, 204, 206).

Figure 3:
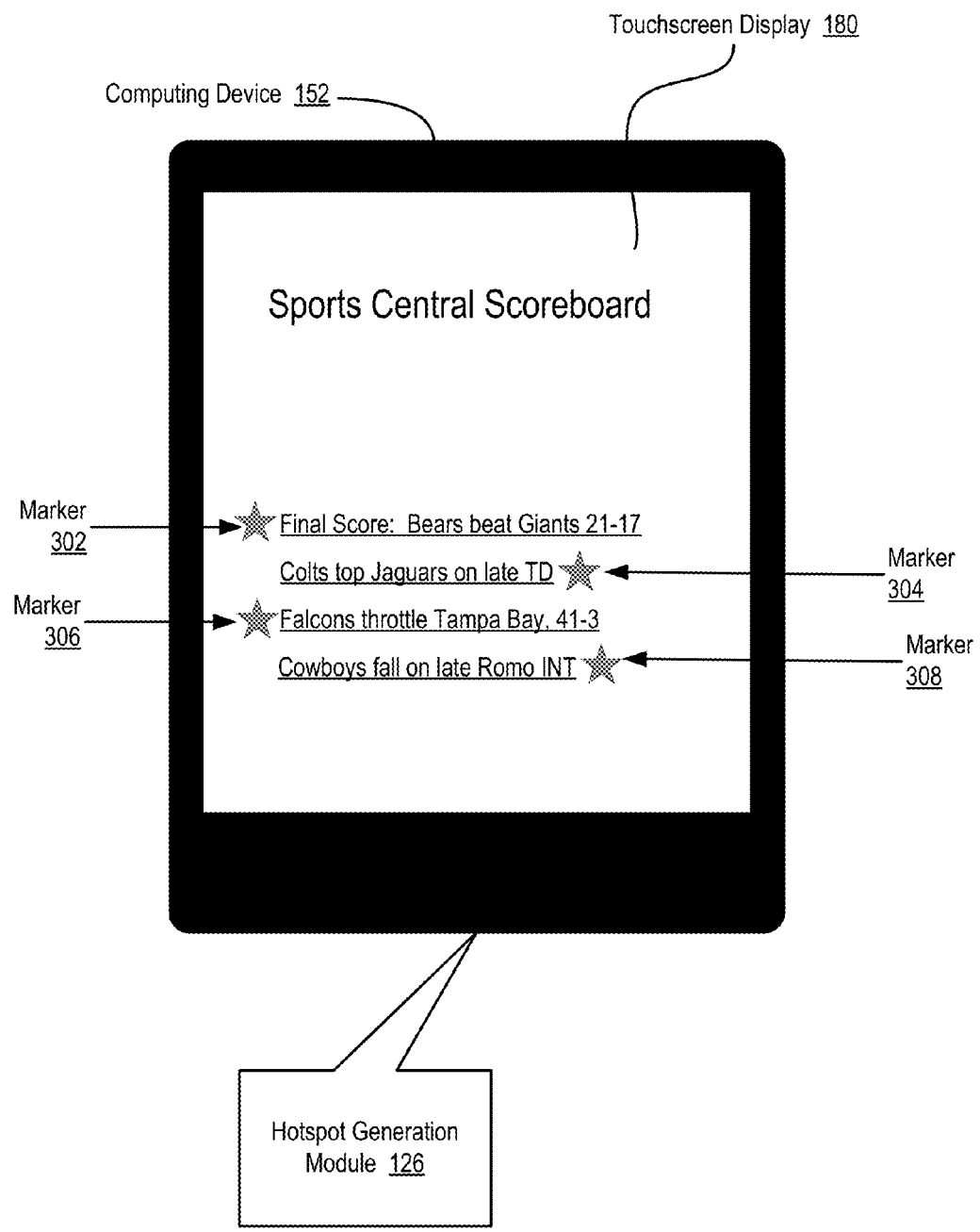
FIG. 3 sets forth a diagram of a computing device that includes a touchscreen display according to embodiments of the present invention.

For further explanation, FIG. 3 sets forth a diagram of a computing device (152) that includes a touchscreen display (180) according to embodiments of the present invention. In the example of FIG. 3, the computing device (152) includes a hotspot generation module (126) as described above with reference to FIG. 1. In the example method of FIG. 3, the hotspot generation module (126) has identified each clickable object displayed on the touchscreen display (180), generated clickable hotspot for each clickable object, determined a position on the touchscreen display (180) for placing each clickable hotspot, and placed the clickable hotspot at the position on the touchscreen display (180) as described above with reference to FIG. 1. In the example of FIG. 3, the updated clickable zone for invoking each clickable object is visually marked by a marker (302, 304, 306, 308) that in this particular example takes the form of a star. In the example of FIG. 3, invoking the clickable object may therefore be carried out by a user touching the portion of the touchscreen display (180) that includes the marker (302, 304, 306, 308) for the desired clickable object. Readers will appreciate that the relative distance between each marker (302, 304, 306, 308) enables the user to more accurately select the desired clickable object as a user is less likely to touch the updated clickable zone for an undesired clickable object.

Figure 4:
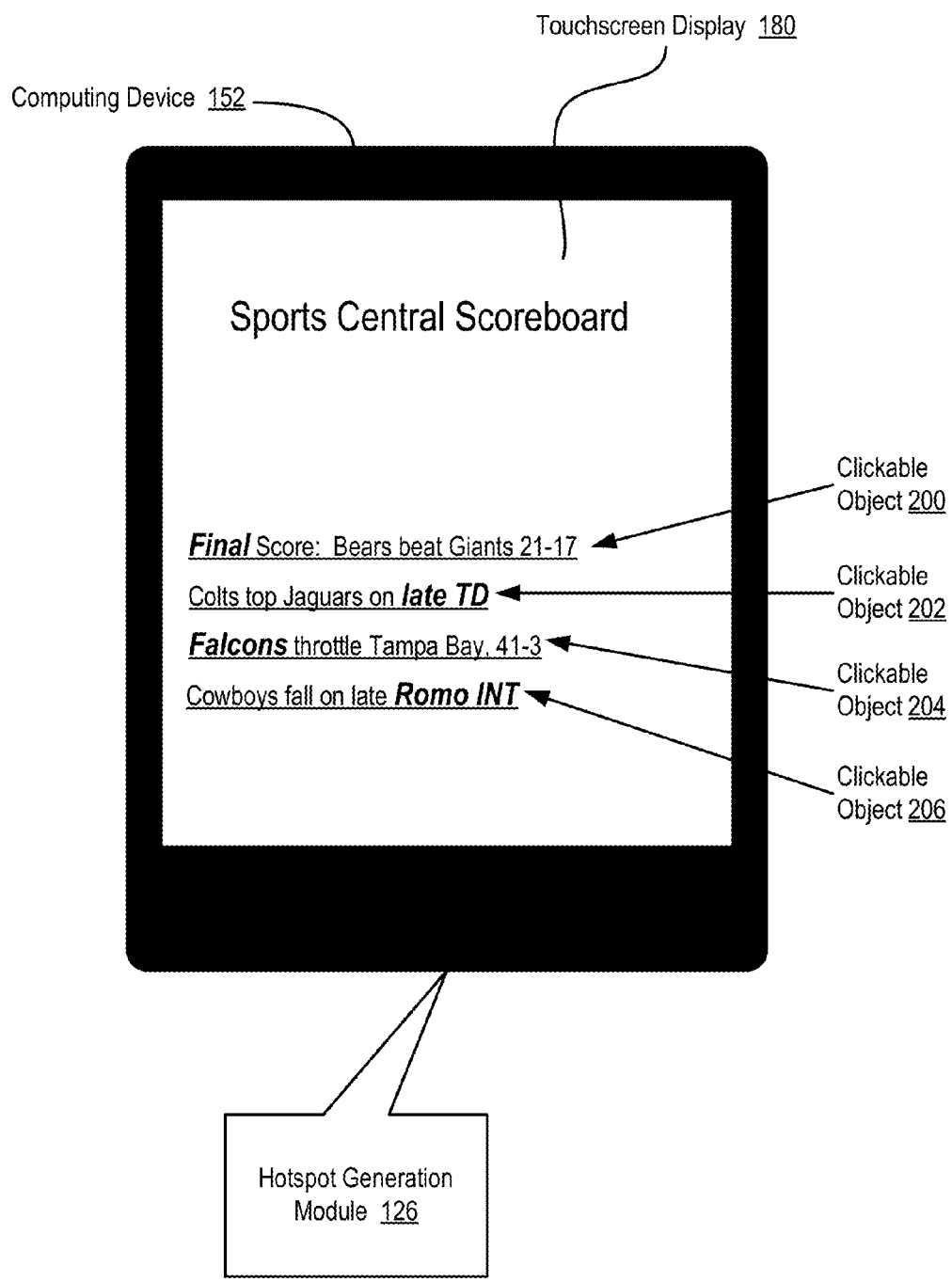
FIG. 4 sets forth a diagram of a computing device that includes a touchscreen display according to embodiments of the present invention.

For further explanation, FIG. 4 sets forth a diagram of a computing device (152) that includes a touchscreen display (180) according to embodiments of the present invention. In the example of FIG. 4, the computing device (152) includes a hotspot generation module (126) as described above with reference to FIG. 1. In the example method of FIG. 4, the hotspot generation module (126) has identified each clickable object (200, 202, 204, 206) displayed on the touchscreen display (180), generated clickable hotspot for each clickable object (200, 202, 204, 206), determined a position on the touchscreen display (180) for placing each clickable hotspot, and placed the clickable hotspot at the position on the touchscreen display (180) as described above with reference to FIG. 1. In the example of FIG. 4, the updated clickable zone for invoking each clickable object (200, 202, 204, 206) is visually marked by altering the appearance of the clickable object (200, 202, 204, 206). For example, the appearance of clickable object (200) has been altered such that the word "Final" has been italicized in bold lettering that is of a larger font that the remaining letters in the hyperlink. Likewise, the appearance of clickable object (202) has been altered such that the words "late TD" have been italicized in bold lettering that is of a larger font that the remaining letters in the hyperlink, the appearance of clickable object (204) has been altered such that the word "Falcons" has been italicized in bold lettering that is of a larger font that the remaining letters in the hyperlink, and the appearance of clickable object (206) has been altered such that the words "Romo INT" have been italicized in bold lettering that is of a larger font that the remaining letters in the hyperlink. In the example of FIG. 4, invoking a particular clickable object (200, 202, 204, 206) may therefore be carried out by a user touching the portion of the touchscreen display (180) that includes the altered appearance of the desired clickable object (200, 202, 204, 206). Readers will appreciate that the relative distance between the portions of the clickable objects (200, 202, 204, 206) whose appearance has been altered enables the user to more accurately select the desired clickable object as a user is less likely to touch the updated clickable zone for an undesired clickable object.

Figure 5:
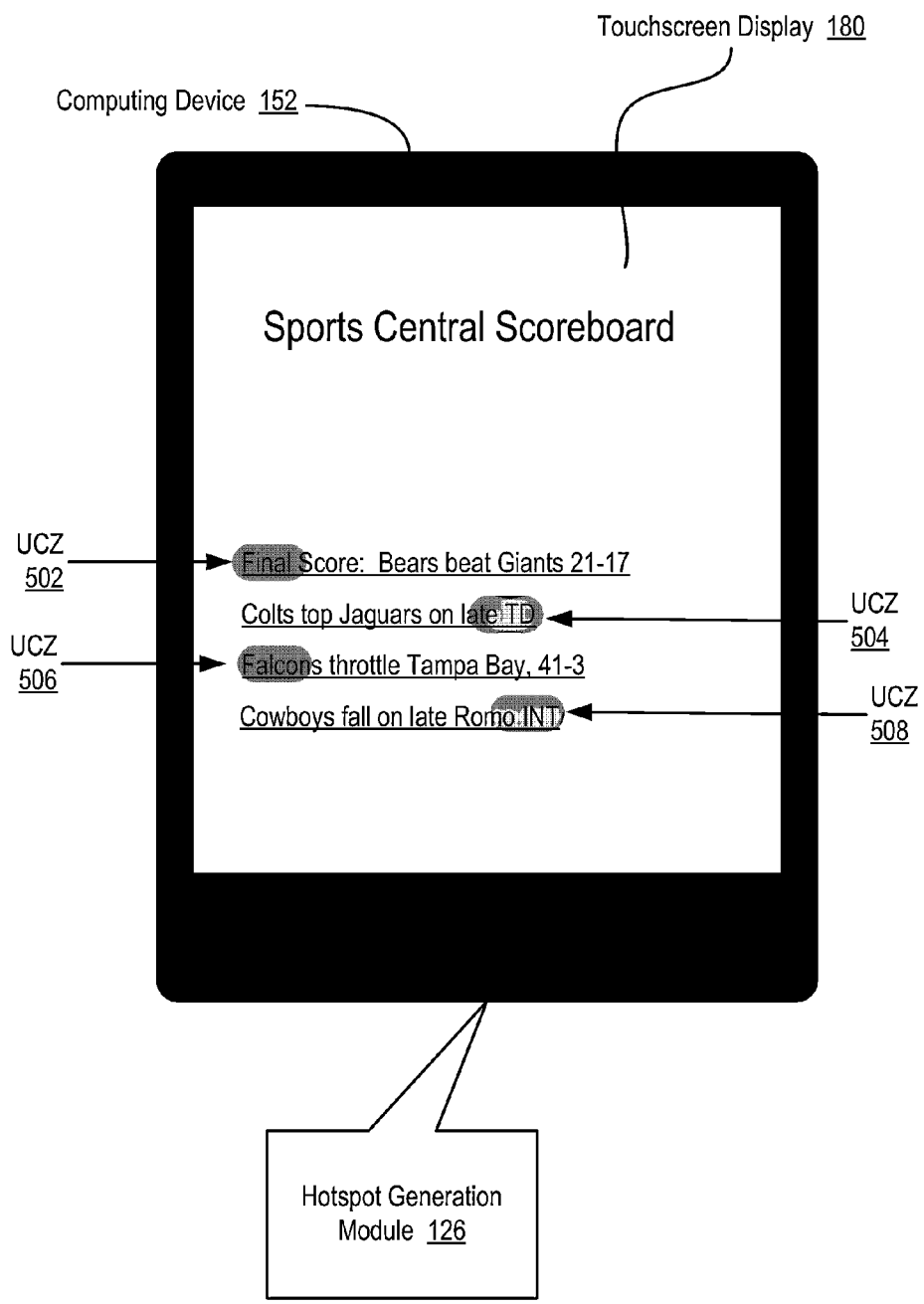
FIG. 5 sets forth a diagram of a computing device that includes a touchscreen display according to embodiments of the present invention.

For further explanation, FIG. 5 sets forth a diagram of a computing device (152) that includes a touchscreen display (180) according to embodiments of the present invention. In the example of FIG. 5, the computing device (152) includes a hotspot generation module (126) as described above with reference to FIG. 1. In the example method of FIG. 5, the hotspot generation module (126) has identified each clickable object displayed on the touchscreen display (180), generated clickable hotspot for each clickable object, determined a position on the touchscreen display (180) for placing each clickable hotspot, and placed the clickable hotspot at the position on the touchscreen display (180) as described above with reference to FIG. 1. In the example of FIG. 5, the updated clickable zone (502, 504, 506, 508) for invoking each clickable object is displayed on the touchscreen display (180). In the example of FIG. 5, the updated clickable zone (502, 504, 506, 508) for invoking each clickable object is displayed on the touchscreen display (180) in the form of a shaded oval. In the example of FIG. 5, invoking the clickable object may therefore be carried out by a user touching the portion of the touchscreen display (180) that includes the updated clickable zone (502, 504, 506, 508) for the desired clickable object. Readers will appreciate that the relative distance between each updated clickable zone (502, 504, 506, 508) enables the user to more accurately select the desired clickable object as a user is less likely to touch the updated clickable zone for an undesired clickable object.

Figure 6:
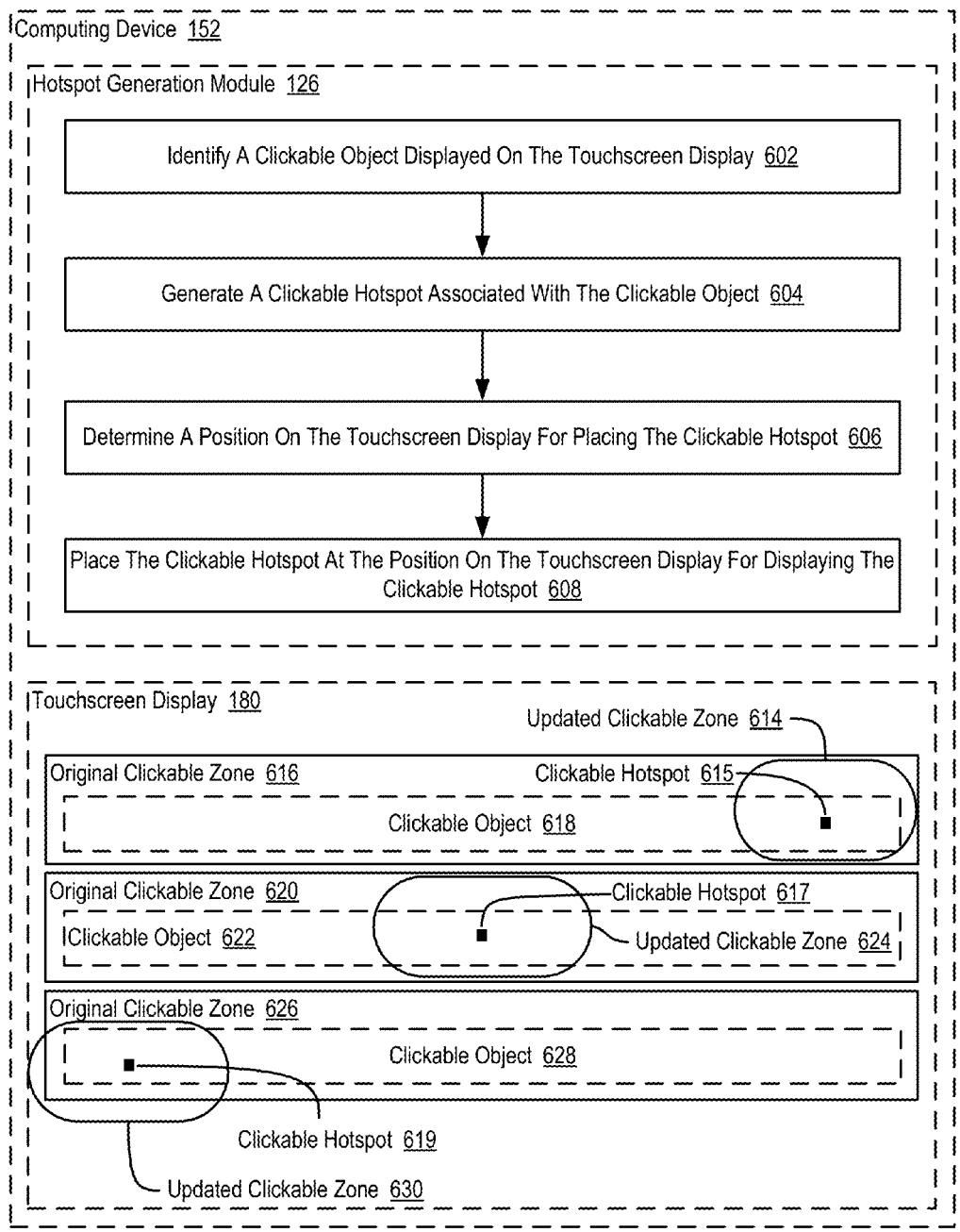
FIG. 6 sets forth a flow chart illustrating an example method for positioning clickable hotspots on a touchscreen display according to embodiments of the present invention.

For further explanation, FIG. 6 sets forth a flow chart illustrating an example method for positioning clickable hotspots on a touchscreen display (180) according to embodiments of the present invention. In the example method of FIG. 6, the touchscreen display (180) is electronic visual display configured to detect the presence and location of a touch within the display area of the touchscreen display (180). The touchscreen display (180) of FIG. 6 is part of a computing device (152) such as a mobile communications device, a tablet computer, and so on. Although the touchscreen display (180) of FIG. 6 is depicted as being part of the computing device (152), readers will appreciate that the touchscreen display (180) may also be embodied as a standalone computing device that is operatively coupled to a computing device (152) such as a personal computer, laptop computer, and the like. In the example method of FIG. 6, the computing device (152) also includes a hotspot generation module (126). In the example method of FIG. 6, the hotspot generation module (126) may be embodied, for example, as a module of computer program instructions configured to execute on computer hardware.

The example method of FIG. 6 includes identifying (602), by a hotspot generation module (126), a clickable object (618, 622, 628) displayed on the touchscreen display (180). In the example method of FIG. 6, the clickable object (618, 622, 628) represents a component displayed on the touchscreen display (180) that, when touched by a user, causes some action to take place. The clickable object (618, 622, 628) of FIG. 6 may be embodied, for example, as a hyperlink or icon that points to particular website, document, or other networked resource. Alternatively, the clickable object (618, 622, 628) of FIG. 6 may be a component within a webform such as a text box, checkbox, radio button.

In the example method of FIG. 6, the clickable object (618, 622, 628) has an associated original clickable zone (616, 620, 626) for invoking the clickable object (618, 622, 628). In the example method of FIG. 6, the original clickable zone (616, 620, 626) for invoking the clickable object (618, 622, 628) represents an area of the touchscreen display (180) that, when touched by a user, represents a user selection of the clickable object (618, 622, 628). Consider an example in which the clickable object (618, 622, 628) is a hyperlink. In such an example, the original clickable zone (616, 620, 626) for invoking the clickable object (618, 622, 628) represents the area of the touchscreen display (180) that, when touched by a user, causes the hyperlink to be invoked.

The example method of FIG. 6 also includes generating (604), by the hotspot generation module (126), a clickable hotspot (615, 617, 619) associated with the clickable object (618, 622, 628). In the example method of FIG. 6, the clickable hotspot has an associated updated clickable zone (614, 622, 630) for invoking the clickable object (618, 622, 628). The updated clickable zone (614, 622, 630) for invoking the clickable object (618, 622, 628) represents an area of the touchscreen display (180) that, when touched by a user, represents a user selection of the clickable object (618, 622, 628). Consider an example in which the clickable object (618, 622, 628) is a hyperlink. In such an example, the updated clickable zone (614, 622, 630) for invoking the clickable object (618, 622, 628) represents the area of the touchscreen display (180) that, when touched by a user, causes the hyperlink to be invoked.

The example method of FIG. 6 also includes determining (606), by the hotspot generation module (126), a position on the touchscreen display (180) for placing the clickable hotspot (615, 617, 619). In the example method of FIG. 6, the position on the touchscreen display (180) for placing the clickable hotspot (615, 617, 619) may be determined (606), for example, such that the average distance between each clickable hotspot (615, 617, 619) may be maximized, such that the distance between each clickable hotspot (615, 617, 619) may be above a predetermined threshold, and so on. In the example method of FIG. 6, the position on the touchscreen display (180) for placing the clickable hotspot (615, 617, 619)

may be specified, for example, using pixel coordinates that specify a location on the touchscreen display (180).

The example method of FIG. 6 also includes placing (608), by the hotspot generation module (126), the clickable hotspot (615, 617, 619) at the position on the touchscreen display (180) that was determined (606) above. In the example method of FIG. 6, the original clickable zone (616, 620, 626) and the updated clickable zone (314, 324, 330) cover different areas of the touchscreen display (180). Readers will appreciate that although each clickable hotspot (615, 617, 619) in FIG. 6 resides in an original clickable zone (616, 620, 626), because the updated clickable zone (614, 624, 630) has a different geometry that the original clickable zone (616, 620, 626), the original clickable zone (616, 620, 626) and the updated clickable zone (614, 624, 630) cover different areas of the touchscreen display (180). In particular, the updated clickable zones (614, 624, 630) are defined by a larger degree of physical separation than the original clickable zones (616, 620, 626), such that a user attempting to invoke a particular clickable object (618, 622, 628) is more likely to invoke the intended clickable object (618, 622, 628) rather than accidentally invoking an unintended clickable object (618, 622, 628).

Figure 7:
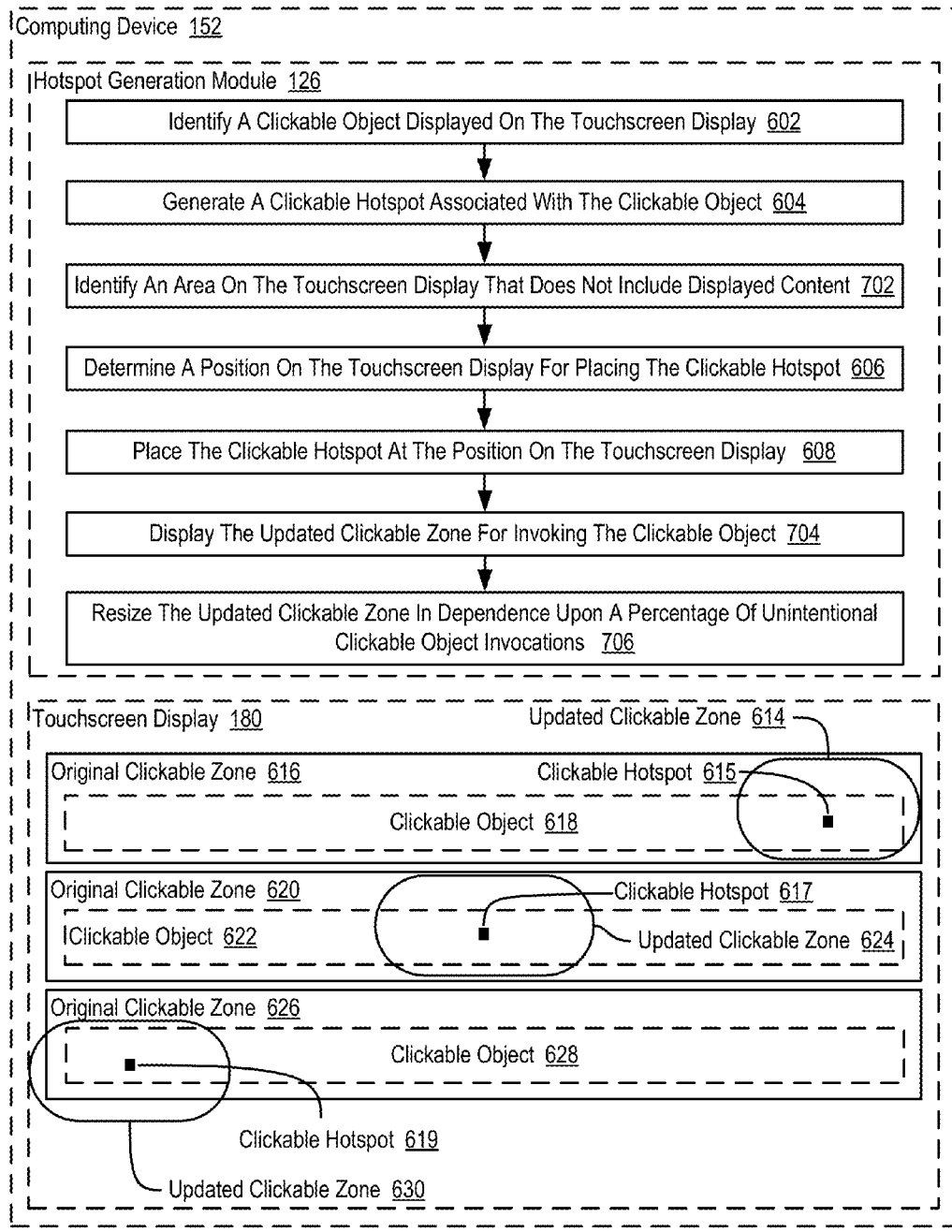
FIG. 7 sets forth a flow chart illustrating a further example method for positioning clickable hotspots on a touchscreen display according to embodiments of the present invention.

For further explanation, FIG. 7 sets forth a flow chart illustrating a further example method for positioning clickable hotspots on a touchscreen display (180) according to embodiments of the present invention. The example of FIG. 7 is similar to the example of FIG. 6, as it also includes identifying (602) a clickable object (618, 622, 628) displayed on the touchscreen display (180), generating (604) a clickable hotspot (615, 617, 619) associated with the clickable object (618, 622, 628), determining (606) a position on the touchscreen display (180) for placing the clickable hotspot (615, 617, 619), and placing (608) the clickable hotspot (615, 617, 619) at the position on the touchscreen display (180) that was determined (606) above.

The example method of FIG. 7 also includes identifying (702), by the hotspot generation module (126), an area on the touchscreen display (180) that does not include displayed content. In the example method of FIG. 7, the area on the touchscreen display that does not include displayed content is a portion of the touchscreen display (180) that is free of user content such as text, images, hyperlinks, and the like. The area on the touchscreen display that does not include displayed content is therefore a portion of the touchscreen display (180) upon which the updated clickable zone (614, 624, 630) for invoking the clickable object (618, 622, 628) may be located. In the example method of FIG. 7, upon identifying (702) such an area on the touchscreen display (180) that does not include displayed content the hotspot generation module (126) may therefore place the updated clickable zone (614, 624, 630) for invoking the clickable object (618, 622, 628) in the area on the touchscreen display that does not include displayed content.

The example method of FIG. 7 also includes displaying (704), by the hotspot generation module (126) on the touchscreen display (180), the updated clickable zone (614, 624, 630) for invoking the clickable object (618, 622, 628). In the example method of FIG. 7, displaying (704) the updated clickable zone (614, 624, 630) for invoking the clickable object (618, 622, 628) may be carried out by rendering a visual indicator that corresponds with the updated clickable zone (614, 624, 630) for invoking the clickable object (618, 622, 628). For example, displaying (704) the updated clickable zone (614, 624, 630) for invoking the clickable object (618, 622, 628) may be carried out by rendering the perimeter of the updated clickable zone (614, 624, 630) for invoking the clickable object (618, 622, 628), by shading the updated clickable zone (614, 624, 630) for invoking the clickable object (618, 622, 628) as depicted above with respect to FIG. 5, and so on.

The example method of FIG. 7 also includes resizing (706), by the hotspot generation module (126) on the touchscreen display (180), the updated clickable zone (614, 624, 630) in dependence upon a percentage of unintentional clickable object invocations. In the example method of FIG. 7, an unintentional clickable object invocation represents an attempt to invoke a particular clickable object (618, 622, 628) that results in a different clickable object (618, 622, 628) actually getting invoked. In the example method of FIG. 7, an unintentional clickable object invocation may be detected, for example, by detecting that a user spends less than a predetermined amount of time viewing the content generated by the invocation of the clickable object—potentially indicating that clickable object that was invoked was not the desired clickable object. In such an example, when the percentage of clickable object invocations that are unintentional exceeds a predetermined threshold, this may be taken as an indication that the updated clickable zone (614, 624, 630) is not properly sized. The updated clickable zone (614, 624, 630) may therefore be resized (706) in an attempt to decrease the percentage of clickable object invocations that are unintentional. For example, the size of the updated clickable zones (614, 624, 630) may be decreased so as to increase the physical distance on the touchscreen display (180) that is between two of more updated clickable zones (614, 624, 630).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of positioning clickable hotspots on a touchscreen display, the method comprising:
   identifying, by a hotspot generation module, a clickable object displayed on the touchscreen display, wherein the clickable object has an associated original clickable zone for invoking the clickable object;
   generating, by the hotspot generation module, a clickable hotspot associated with the clickable object, wherein the clickable hotspot has an associated updated clickable zone for invoking the clickable object;
   determining, by the hotspot generation module, a position on the touchscreen display for placing the clickable hotspot, wherein the average distance between each clickable hotspot is above a predetermined threshold;
   placing, by the hotspot generation module, the clickable hotspot at the position on the touchscreen display, wherein the original clickable zone and the updated clickable zone cover different areas of the touchscreen display, and wherein the original clickable zone and the updated clickable zone are simultaneously visually indicated; and
   displaying, by the hotspot generation module on the touchscreen display, the updated clickable zone for invoking the clickable object.

2. The method of claim 1 wherein the updated clickable zone for invoking the clickable object is visually marked by a marker.

3. The method of claim 1 wherein the updated clickable zone for invoking the clickable object is visually marked by altering the appearance of the clickable object.

4. The method of claim 1 wherein the updated clickable zone for invoking the clickable object is shaped as an oval.

5. The method of claim 1 further comprising resizing, by the hotspot generation module on the touchscreen display, the updated clickable zone in dependence upon a percentage of unintentional clickable object invocations.

6. The method of claim 1 further comprising:
   identifying, by the hotspot generation module, an area on the touchscreen display that does not include displayed content; and
   wherein the updated clickable zone for invoking the clickable object is located in the area on the touchscreen display that does not include displayed content.

7. An apparatus for positioning clickable hotspots on a touchscreen display, the apparatus comprising a computer processor, a computer memory operatively coupled to the computer processor, the computer memory having disposed within it computer program instructions that, when executed by the computer processor, cause the apparatus to carry out the steps of:

identifying, by a hotspot generation module, a clickable object displayed on the touchscreen display, wherein the clickable object has an associated original clickable zone for invoking the clickable object;

generating, by the hotspot generation module, a clickable hotspot associated with the clickable object, wherein the clickable hotspot has an associated updated clickable zone for invoking the clickable object;

determining, by the hotspot generation module, a position on the touchscreen display for placing the clickable hotspot, wherein the average distance between each clickable hotspot is above a predetermined threshold;

placing, by the hotspot generation module, the clickable hotspot at the position on the touchscreen display, wherein the original clickable zone and the updated clickable zone cover different areas of the touchscreen display, and wherein the original clickable zone and the updated clickable zone are simultaneously visually indicated; and displaying, by the hotspot generation module on the touchscreen display, the updated clickable zone for invoking the clickable object.

8. The apparatus of claim 7 wherein the updated clickable zone for invoking the clickable object is visually marked by a marker.

9. The apparatus of claim 7 wherein the updated clickable zone for invoking the clickable object is visually marked by altering the appearance of the clickable object.

10. The apparatus of claim 7 wherein the updated clickable zone for invoking the clickable object is shaped as an oval.

11. The apparatus of claim 7 further comprising computer program instructions that, when executed by the computer processor, cause the apparatus to carry out the step of resizing, by the hotspot generation module on the touchscreen display, the updated clickable zone in dependence upon a percentage of unintentional clickable object invocations.

12. The computer program product of claim 11 further comprising computer program instructions that, when executed, cause the computer to carry out the step of:

identifying, by the hotspot generation module, an area on the touchscreen display that does not include displayed content; and wherein the updated clickable zone for invoking the clickable object is located in the area on the touchscreen display that does not include displayed content.

13. The apparatus of claim 7 further comprising computer program instructions that, when executed by the computer processor, cause the apparatus to carry out the step of:

identifying, by the hotspot generation module, an area on the touchscreen display that does not include displayed content; and wherein the updated clickable zone for invoking the clickable object is located in the area on the touchscreen display that does not include displayed content.

14. A computer program product for positioning clickable hotspots on a touchscreen display, the computer program product disposed upon a non-transitory computer readable medium, the computer program product comprising computer program instructions that, when executed, cause a computer to carry out the steps of:

identifying, by a hotspot generation module, a clickable object displayed on the touchscreen display, wherein the clickable object has an associated original clickable zone for invoking the clickable object;

generating, by the hotspot generation module, a clickable hotspot associated with the clickable object, wherein the clickable hotspot has an associated updated clickable zone for invoking the clickable object;

determining, by the hotspot generation module, a position on the touchscreen display for placing the clickable hotspot, wherein the average distance between each clickable hotspot is above a predetermined threshold;

placing, by the hotspot generation module, the clickable hotspot at the position on the touchscreen display, wherein the original clickable zone and the updated clickable zone cover different areas of the touchscreen display, and wherein the original clickable zone and the updated clickable zone are simultaneously visually indicated; and displaying, by the hotspot generation module on the touchscreen display, the updated clickable zone for invoking the clickable object.

15. The computer program product of claim 14 wherein the updated clickable zone for invoking the clickable object is visually marked by a marker.

16. The computer program product of claim 14 wherein the updated clickable zone for invoking the clickable object is visually marked by altering the appearance of the clickable object.

17. The computer program product of claim 14 wherein the updated clickable zone for invoking the clickable object is shaped as an oval.

18. The computer program product of claim 14 further comprising computer program instructions that, when executed, cause the computer to carry out the step of resizing, by the hotspot generation module on the touchscreen display, the updated clickable zone in dependence upon a percentage of unintentional clickable object invocations.

* * * * *